Jan. 6, 1948.　　　　F. E. JEFFERS　　　　2,434,074
ATTACHMENT FOR DIGGING IMPLEMENTS
Filed Jan. 18, 1947
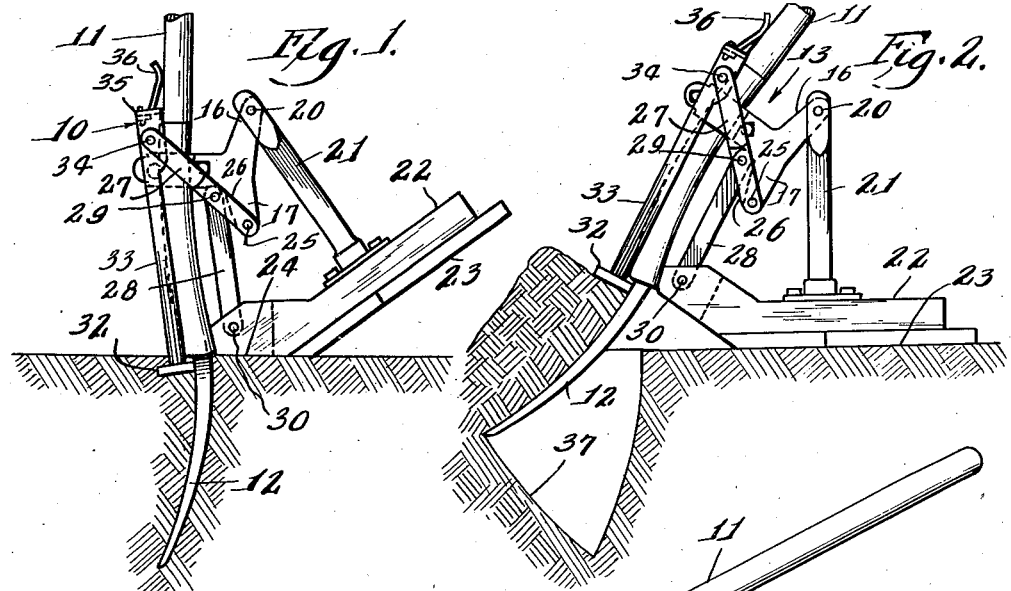
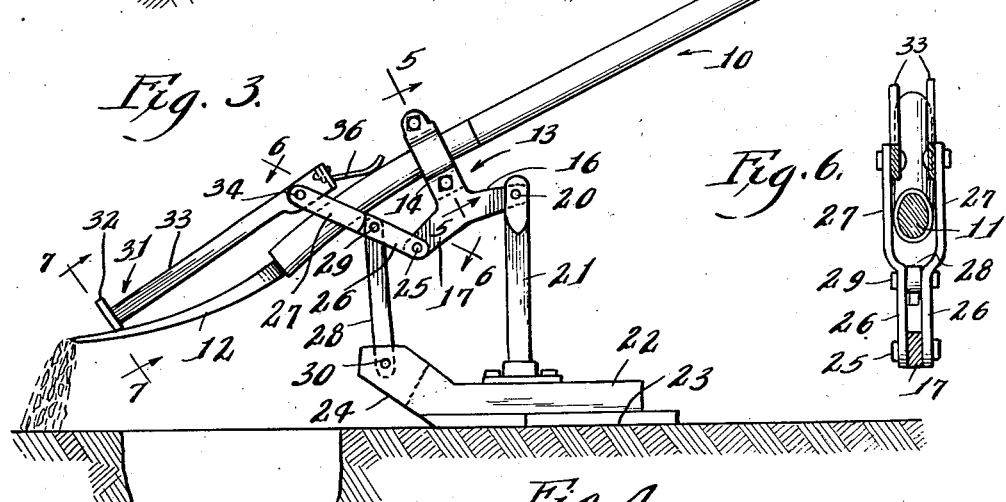
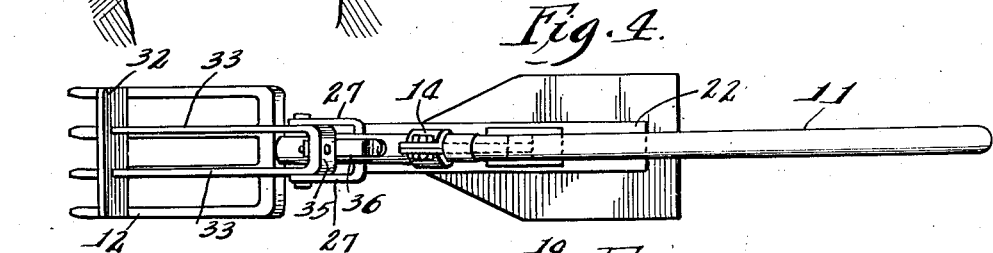
Inventor.
Frank E. Jeffers.
By John M. Darley
Attorney.

Patented Jan. 6, 1948

2,434,074

UNITED STATES PATENT OFFICE 2,434,074

ATTACHMENT FOR DIGGING IMPLEMENTS

Frank E. Jeffers, Wheaton, Ill.

Application January 18, 1947, Serial No. 722,882

9 Claims. (Cl. 254—131.5)

My invention relates to an attachment for a digging implement, such as a spade, fork or shovel, which enables the implement to be operated with a minimum effort for excavation and removal of the excavated load.

The present invention is in the nature of an improvement on the digging implement disclosed and claimed in my United States Letters Patent No. 2,092,279, dated September 7, 1937. As noted therein, the use of the ordinary shovel places an excessive burden on the back and arm muscles, since except for the slight fulcruming action of the shovel blade in the first phase of excavation, virtually the entire effort is a dead lift of the shovel and its load which must thereafter be fatiguingly discharged by a tossing movement.

It is therefore one object of my invention to devise an attachment for a digging implement which is constructed and arranged to reduce the effort required to lift the excavated load by fulcruming the implement handle on the surface of the soil.

A further object is to provide an attachment of the character indicated which includes devices that eliminate the necessity of discharging the shovel load by the usual swinging or tossing movement of the shovel, but accomplishes this result automatically when the load has been raised a predetermined distance out of the excavation.

A further object is to provide an implement equipped with the improved attachment whose weight is only slightly in excess of a standard implement so that changes in position may be easily effected, and whose fulcrum elevation above the ground obviates any bending of the operator's body.

A further object is to devise a digging implement attachment which is characterized by an improved mechanical advantage relative to the patented device, which does not require any modification of the implement proper, and in which the major portion of the device is located on the under side of the implement handle, operatively considered.

These and further objects of the invention will be set forth in the following specification, reference being had to the accompanying drawing, and the novel means by which said objects are effectuated will be definitely pointed out in the claims.

In the drawing,

Fig. 1 is a side elevation of a digging implement equipped with the attachment and showing the position thereof when the ground inserting part has been forced into the soil, or in other words, the first step in the use of the implement.

Fig. 2 is a view showing the implement rocked to a position in which the foot of the attachment is resting on the ground, the ground inserting part of the implement being moved to a position in which it is beginning to raise the excavated load.

Fig. 3 shows the terminal position of the implement in which the excavated load has been discharged clear of the excavation.

Fig. 4 is a plan view of the implement as shown in Fig. 3.

Fig. 5 is an enlarged section along the line 5—5 in Fig. 3.

Fig. 6 is an enlarged, detail section along the line 6—6 in Fig. 3.

Fig. 7 is an enlarged section along the line 7—7 in Fig. 3 showing a modified construction of the pusher blade whereby the latter is restrained against movements laterally of the implement.

Referring to the drawing, the numeral 10 designates a digging fork which is intended to generically represent any type of hand digging implement, including shovels and spades, and which is provided with a handle 11 and a fork or ground inserting part 12. At a convenient distance from the handle end of the fork, a Y-shaped rocker 13 is clamped to the handle 11, the rocker consisting of a limb 14 which is shaped at 15 to fit one side of the handle and oppositely extending arms 16 and 17, the opposite side of the handle being engaged by a complementary cap 18 that is secured to the portion 15 by bolts 19. The portion 15 and clamping cap 18 provide the major connection of the attachment to the fork and enables the rocker 13 to be positioned at that part of the handle 11 which will insure the best service and without any change in the handle which would ordinarily be of standard type.

The outer end of the arm 16 is pivoted at 20 to the upper end of a standard 21 whose lower end is rigidly secured to a foot 22 having an under surface 23 normal to the standard 21 and an under surface 24 which intersects and is angularly related to the surface 23. The surface 23 has sufficient area to provide an adequate support for the fulcrumming action of the device as hereinafter described. The outer end of the arm 17 is received between and is pivotally secured at 25 to the adjacent ends of a pair of links 26 which extend towards and beyond the handle 11, being offset at 27—27 to conveniently straddle and have guiding relation to the handle. Between the offsets 27 and the pivot 25, one end of an arm 28 extends between and is pivotally secured at 29 to the links 26, this pivot connection being approximately midway of the length dimension of the links in the particular design shown, and the opposite end of the arm 28 is pivoted at 30 to the foot 22 at that end thereof which includes the inclined surface 24.

So far as described, the major portion of the attachment is disposed on one side of the handle 11, or beneath the handle when the parts occupy the positions shown in Fig. 3. The only portion of the attachment which lies on the opposite side of the handle is a reciprocating pusher or load discharging device 31 comprising a blade 32 which extends transversely and completely across the tines of the fork 12 and, when in the retracted position shown in Figs. 1 and 2, is located close to the adjacent end of the handle 11. The blade 32 is actuated by a pair of parallel bars 33 which extend lengthwise of the fork 12, each bar being pivotally secured as at 34 to the end of a link 26 on the bar side of the handle 11. The bars 33 extend beyond the pivots 34 and are connected by a cross piece 35 (see Fig. 4) to which is secured a spring finger 36 which bears upon the handle 11 for a purpose presently explained.

In using a fork equipped with the attachment, the pusher blade 32 is moved to the retracted position shown in Fig. 1 by simply rocking the handle 11 in a counterclockwise direction, as the attachment is viewed in the several figures, and the fork 12 is then driven into the ground so that the handle 11 is in a generally vertical position. The parts then occupy the relative positions shown in Fig. 1 with the foot surface 24 resting on the ground and the foot 22 therefore inclined to the ground, and the cross piece 35 located above the clamping elements 15 and 18.

The operator then rocks the handle clockwise to the position shown in Fig. 2 in which the foot surface 23 is rested directly on the ground. The fork 12 then has moved to the position illustrated and has begun to raise the load from the excavation 37, but the pusher blade 32 still lies in a retracted position since the attachment is bodily rocked to the Fig. 2 position without relative movements of the actuating parts for the blade.

Continued rocking movement of the handle 11 in a clockwise direction to the position illustrated in Fig. 3 raises the excavated load clear of the excavation 37. During this movement, the rocker 13 swings clockwise about the pivot 20 and, in the initial phase of this swing, the links 26 are shifted upwardly and outwardly relative to the foot 22, thus lifting the cross piece 35 clear of the clamping elements 15 and 18. As the rocker 13 continues its swing, the combined action of the links 26 and the arm 28 effects a traverse of the pusher blade 32 from the position shown in Fig. 2 to that illustrated in Fig. 3, thus discharging the load on the fork 12 clear of the excavation 37. After the cross piece 35 has moved past the clamping elements 15 and 18 in the load discharging direction, the pressure of the spring 36 on the handle 11 maintains the pusher blade 32 in contact with the tines of the fork 12 and, in addition, serves to cushion the striking of the cross piece 35 against the handle during shifting to opposite sides of the clamping elements 15 and 18.

Compared to the device disclosed in the patent identified above, the present design is characterized by certain structural features which increase the mechanical advantage of the attachment, namely, the offset mounting of the handle 11 on the standard 21 by means of the rocker 13, and the toggle-like construction afforded by the arms 16 and 17 and the links 26, the knee of the toggle being the pivot 25. Action of the toggle is controlled by the arm 28.

After the load has been discharged, the operator rocks the handle 11 in the opposite direction to place the several parts in the retracted positions shown in Fig. 1, after which the fork may be located in a new excavating position. It is never necessary to lift the structure from the ground to place it in a new digging position, since a simple sliding on the ground or a pivot of the foot to right or left will place the fork in the new location. The device may be used by a right or left hand person and, at all times, the operator remains in an upright position.

The implement is highly useful for the purpose of digging trenches, individual holes, or the spading or loosening of ground preparatory to gardening. It will be particularly noted that at no time is the burden placed upon the operator of actually lifting the load by an action or movement comparable to that required in the use of the ordinary spade. Merely a rocking movement of the handle 10 serves to lift the load and, in so doing, the operator is benefited by the obvious lever action present which reduces the muscular effort required and the digging time for any given job.

The straddling of the handle 11 by the links 26 provides an adequate restraint against any tendency of the pusher blade 32 to move laterally of the fork 12, but an additional guide may be provided by lugs 37 (see Fig. 7) depending from the blade and guidably engaging the inner tines of the fork.

I claim:

1. An attachment for a digging implement having a handle and a ground inserting part comprising a foot adapted to rest on the ground and having a rigid standard extending upwardly therefrom, a rocker pivoted on the standard and arranged for securement to the handle, a load discharging device shiftable across the face of the part, link means connecting the rocker and the device, and a control arm pivoted on the foot and pivotally secured to an intermediate part of the link means, the link means being operable by the swinging movement of the handle in a load raising direction for actuating the device.

2. An attachment for a digging implement having a handle and a ground inserting part comprising a foot adapted to rest on the ground and having a rigid standard extending upwardly therefrom, a rocker pivoted on the standard and arranged for securement to the handle, discharging means shiftable across the face of the part between positions adjacent the handle and the extremity of the part for removing the excavated load, link means connecting the rocker and the discharging means, and a control arm pivoted on the foot and pivotally secured to an intermediate part of the link means, the link means being operable by the swinging movement of the handle in one direction to remove the load and in the opposite direction to retract the discharge means.

3. An attachment for a digging implement having a handle and a ground inserting part comprising a foot adapted to rest on the ground and having a rigid standard extending upwardly therefrom, means providing an offset pivot support for the handle on the standard, a load discharging device shiftable across the face of the part, link means connecting the offset means and the device, and a control arm pivoted on the foot and pivotally secured to an intermediate part of the link means, the link means being operable by the swinging movement of the handle in a load raising direction for actuating the device.

4. An attachment for a digging implement having a handle and a ground inserting part comprising a foot adapted to rest on the ground and having a rigid standard extending upwardly therefrom, a load discharging device shiftable across the face of the part, toggle means comprising a pair of pivotally secured members, the members being respectively pivotally attached to the device and the standard and the latter member being arranged for securement to the handle, and a control arm pivoted on the foot and pivotally secured to an intermediate part of that toggle member which is attached to the device, the toggle means being operable by the rocking movement of the handle in a load raising direction for actuating the device.

5. An attachment for a digging implement having a handle and a ground inserting part comprising a foot adapted to rest on the ground and having a rigid standard extending upwardly therefrom, a rocker pivoted on the standard and arranged for securement to the handle, a load discharging device shiftable across the face of the part, a pair of links connecting the rocker and the device and spaced to straddle the handle for guidance thereon, and a control arm pivoted on the foot and pivotally secured to an intermediate part of the links, the links being operable by the swinging movement of the handle in a load raising direction for actuating the device.

6. The combination with a digging implement having a handle and a ground inserting part, of a foot adapted to rest on the ground as a fulcrum and having a rigid standard extending upwardly therefrom, a rocker pivoted on the standard and arranged for securement to the handle, a load discharging device shiftable across the face of the part, link means connecting the rocker and the device, and a control arm pivoted on the foot and pivotally secured to an intermediate part of the link means, the link means being operable by the swinging movement of the handle in a load raising direction for actuating the device.

7. The combination with a digging implement having a handle and a ground inserting part, of a foot adapted to rest on the ground as a fulcrum and having a rigid standard extending upwardly therefrom, a load discharging device shiftable across the face of the part, toggle means comprising a pair of pivotally secured members, the members being respectively pivotally attached to the device and the standard and the latter toggle member being arranged for securement to the handle, and a control arm pivoted on the foot and pivotally secured to an intermediate part of that toggle member which is attached to the device, the toggle means being operable by the rocking movement of the handle in a load raising direction for actuating the device.

8. An attachment for a digging implement having a handle and a ground inserting fork comprising a foot adapted to rest on the ground and having a rigid standard extending upwardly therefrom, a rocker pivoted on the standard and arranged for securement to the handle, a load discharging device shiftable lengthwise of the tines of the fork and having lugs guidable by the tines, link means connecting the rocker and the device, and a control arm pivoted on the foot and pivotally secured to an intermediate part of the link means, the link means being operable by the swinging movement of the handle in a load raising direction for actuating the device.

9. An attachment for a digging implement having a handle and a ground inserting fork comprising a foot adapted to rest on the ground and having a rigid standard extending upwardly therefrom, a rocker pivoted on the standard and arranged for securement to the handle, a load discharging device shiftable lengthwise of the tines of the fork and having lugs guidable by the tines, a pair of links connecting the rocker and the device and spaced to straddle the handle for guidance thereon, and a control arm pivoted on the foot and pivotally secured to an intermediate part of the links, the links being operable by the swinging movement of the handle in a load raising direction for actuating the device.

FRANK E. JEFFERS.

REFERENCES CITED

The following references are of record in the file of this patent:

UNITED STATES PATENTS

| Number | Name | Date |
| --- | --- | --- |
| 1,296,738 | Bekke | Mar. 11, 1919 |
| 2,092,279 | Jeffers | Sept. 7, 1937 |

FOREIGN PATENTS

| Number | Country | Date |
| --- | --- | --- |
| 366,936 | Germany | Aug. 17, 1936 |